(12) United States Patent
Mercelis (10) Patent No.: US 11,123,927 B2
(45) Date of Patent: Sep. 21, 2021

(54) METHOD AND DEVICE FOR CREATING A GAS STREAM DURING THE ADDITIVE MANUFACTURING OF A PRODUCT IN A POWDER BED

(71) Applicant: Common Sense Engineering and Consult B.V.B.A., Geel (BE)

(72) Inventor: Peter Mercelis, Geel (BE)

(73) Assignee: COMMON SENSE ENGINEERING AND CONSULT B.V.B.A., Geel (BE)

( * ) Notice: Subject to any disclaimer, the term of this patent is extended or adjusted under 35 U.S.C. 154(b) by 33 days.

(21) Appl. No.: 16/750,128

(22) Filed: Jan. 23, 2020

(65) Prior Publication Data

US 2020/0346409 A1 Nov. 5, 2020

(30) Foreign Application Priority Data

May 2, 2019 (BE) .................................. 2019/5291

(51) Int. Cl.
*B29C 64/364* (2017.01)
*B33Y 10/00* (2015.01)
(Continued)

(52) U.S. Cl.
CPC ............ *B29C 64/364* (2017.08); *B22F 10/28* (2021.01); *B22F 10/322* (2021.01); *B22F 12/70* (2021.01);
(Continued)

(58) Field of Classification Search
CPC ... B29C 64/371; B29C 64/245; B29C 64/153; B29C 64/364; B22F 10/28; B22F 10/322; B22F 12/30; B22F 12/70
See application file for complete search history.

(56) References Cited

U.S. PATENT DOCUMENTS

2016/0001401 A1* 1/2016 Dimter .................. B33Y 50/02
219/76.12
2016/0193695 A1 7/2016 Haynes
(Continued)

FOREIGN PATENT DOCUMENTS

DE 19952998 A1 5/2001
DE 102014217786 A1 3/2016
(Continued)

*Primary Examiner* — Mary Lynn F Theisen
(74) *Attorney, Agent, or Firm* — Browdy and Neimark, PLLC (57) ABSTRACT

Device and method for the layered manufacture of a three-dimensional product (1) with a recess (3), in which successive powder layers are applied to a building surface (15) above a building platform (4), wherein this building platform (4) extends in a space between a tube wall (6) of a building tube (5) and an insert provided therein (9), wherein a beam of rays (18) is made to impinge on each powder layer and this beam (18) is moved across the powder layer to form successive layers of said product (1) above the building platform (4), so that the insert (9) extends in said recess (3). According to the invention, a gas stream (24) is generated above the building surface (15), extending above said space, wherein it is made sure that this gas stream (24) crosses said beam of rays (18) wherein flue gases formed while the beam of rays (18) strikes said powder layer, are discharged through this gas stream (24).

19 Claims, 5 Drawing Sheets

(51) Int. Cl.
  *B33Y 30/00* (2015.01)
  *B29C 64/153* (2017.01)
  *B29C 64/371* (2017.01)
  *B22F 12/70* (2021.01)
  *B22F 10/28* (2021.01)
  *B29C 64/245* (2017.01)
  *B22F 10/322* (2021.01)

(52) U.S. Cl.
  CPC .......... *B29C 64/153* (2017.08); *B29C 64/245* (2017.08); *B29C 64/371* (2017.08); *B33Y 10/00* (2014.12); *B33Y 30/00* (2014.12)

(56) References Cited

U.S. PATENT DOCUMENTS

| | | |
|---|---|---|
| 2017/0282463 A1 | 10/2017 | Schilling |
| 2018/0297283 A1 | 10/2018 | Hagedorn et al. |
| 2019/0118262 A1* | 4/2019 | Eichenberg ........... B29C 64/371 |
| 2020/0368963 A1* | 11/2020 | Shimoda ................ B33Y 40/00 |
| 2021/0023788 A1* | 1/2021 | Shimoda ............... B29C 64/364 |

FOREIGN PATENT DOCUMENTS

| | | |
|---|---|---|
| DE | 102015109849 A1 | 12/2016 |
| EP | 2711110 A2 | 3/2014 |
| EP | 2732890 A2 | 5/2014 |
| GB | 2543305 A | 4/2017 |
| WO | 2014165265 A1 | 10/2014 |
| WO | 2020/104202 A1 | 5/2020 |

\* cited by examiner

METHOD AND DEVICE FOR CREATING A GAS STREAM DURING THE ADDITIVE MANUFACTURING OF A PRODUCT IN A POWDER BED

The invention concerns a device for the layered manufacture of a three-dimensional product from successive powder layers by an additive manufacturing technique in which the product has at least one recess which, for example, extends between two opposite sides of the product.

Thus, a building platform is provided in a building chamber that can be moved vertically in a building tube that has an inner wall and, preferably, a horizontal open top. The edge of the building platform connects to the inner wall of the building tube. A horizontal building surface extends above the building platform. In addition, a powder distributor is provided for the application of successive layers of powder on the building surface, and a radiation source is provided for the generation of at least one energetic beam of rays, which works in conjunction with scanning means to make the beam of rays strike said successive powder layers and to move it across these powder layers in order to form successive interconnected layers of the product in question.

The energetic beam of rays may include, for example, a laser beam or an electron beam.

In addition, the device contains at least one insert that extends in a vertical direction through a recess in the building platform provided to this end, so that the building platform and the insert can be moved vertically in relation to each other. The circumference of the insert fits almost perfectly onto the recess in the building platform, which recess preferably extends in a horizontal plane.

The invention also concerns a method for the layered manufacture of said three-dimensional product, wherein successive powder layers are applied to a building surface above a building platform and wherein a beam of rays is made to strike each powder layer and this beam is moved over the powder layer in order to form successive layers of said product in the space above the building platform so that the insert extends into the recess of the product. After forming a layer of the product, the building platform is moved down over a height that matches the thickness of a powder layer, and then a subsequent powder layer is applied.

The production of a three-dimensional product by means of an additive manufacturing technique based on a powder which is applied in successive powder layers to form a powder bed in which the product is formed is known by anyone skilled in the art. Such manufacturing of a product is usually carried out in a closed building chamber under a protective or inert atmosphere, or generally under a modified atmosphere.

With this, for example, the powder is locally heated in the various powder layers in order to melt it, at least in part, and then solidify it in order to form successive layers of the product to be manufactured and to join these layers together. Such production methods include, for example, selective laser sintering and selective laser melting. When the powder material is heated by the incident beam of rays on the powder, smoke is produced and particles of dust may be released above the building surface. The smoke and any dust particles, such as combustion particles, make it difficult to focus the laser and/or they will contaminate the optical elements. This may cause deviations in the quality of the product produced. For example, unwanted microstructures, micro-porosities and/or embedding of impurities may occur. In order to prevent this, these flue gases, including any dust particles that may be generated, must be removed. A laminar gas stream is created above the building surface to discharge the flue gases and dust particles. However, this does not always give the desired result. In particular, it is not possible to remove flue gases and dust particles efficiently and sufficiently when manufacturing products that extend over a large horizontal surface.

It is also necessary to provide a large and extensive powder bed when manufacturing large products. However, in most cases, only a small portion of the powder in this powder bed actually forms part of the manufactured product. This is particularly the case for products consisting of hollow structures, such as, for example, annular or tubular products or similar products having a longitudinal recess.

For the manufacture of such products, a large quantity of powder is used in the powder bed whereas only a relatively small part of this powder is effectively incorporated in the product. The excess powder may be recycled, but is subject to degradation and contamination. Thus, a large portion of the used powder will no longer be suitable for reuse in a subsequent production process.

In order to influence, for example, the microstructure and/or the residual stress of a product to be manufactured, the temperature of the powder bed and/or the manufactured product should preferably be controlled. Heating and/or cooling elements can be provided for this purpose in order to regulate the temperature of the inner wall of the building tube. Through this inner wall, heat is then supplied to the powder bed or removed from the latter. However, when the powder bed has a relatively large horizontal diameter, it is extremely difficult to efficiently and accurately control the temperature of the powder bed and of the product being formed within an acceptable time interval.

The invention aims to propose a device and method to remedy the above-mentioned disadvantages and which will allow for the efficient removal of flue gases and/or dust particles.

To this end, the device according to the invention contains at least a first gas stream element with at least a first nozzle that opens at the top of the insert, while at least a second gas stream element is provided with at least a second nozzle so as to make it possible to generate a gas stream above said building surface between said first gas stream element and said second gas stream element in order to discharge flue gases, including dust particles, produced during the manufacture of said product, as claimed in the appended claims.

Practically, the building surface should extend at least partially between the insert and the inner wall of the tube in order to build up said product at least partially around this insert, so that when the product is manufactured the insert is at least partially situated in the recess.

In particular, the nozzle of the second gas stream element extends sideways next to the tube.

More in particular, the nozzle of said second gas stream element extends above said building surface.

Advantageously, the building tube has a horizontal open top in which the building surface extends above the building platform.

In a very advantageous manner, said insert shows a top that extends in the plane of the top of said tube.

According to an interesting embodiment of the invention, the first gas stream element extends at least partly through the aforementioned insert, preferably in a mainly vertical direction.

According to a preferred embodiment of the device, said second gas stream element has a nozzle with an opening that extends along almost the entire circumference of the top of said building tube.

The invention also concerns a method in which the three-dimensional product is at least partly built around the insert, as claimed in the appended claims. According to this method, successive powder layers are applied to a building surface above a building platform, wherein this building platform extends in a space between the inner wall of a building tube and an insert provided in the latter. A beam of rays is incident on each powder layer and this beam is moved across the powder layer to form successive layers of said product in said space above the building platform so that the insert extends into said recess of the product. After a layer of the product has been formed, the building platform is moved down over a height matching the thickness of a powder layer, and then a subsequent powder layer is applied to form a subsequent layer of the product.

This method is characterized in that a gas stream is generated above the building surface which extends at least partially above said space from the top of said inner wall to the top of said insert, or vice versa, wherein it is ensured that this gas stream crosses said beam of rays, wherein flue gases and/or dust particles, which are formed when the beam of rays strikes said powder layer, are discharged by this gas stream.

Other particularities and advantages of the invention will become clear from the following description of some specific embodiments of the device and method according to the invention. This description is given as an example only and does not limit the scope of the claimed protection in any way; the reference figures used below refer to the accompanying drawings.

In the different figures, the same reference figures refer to the same or similar elements.

The invention in general concerns a device and method for the layered manufacture of a three-dimensional product having a recess which extends over at least part of the vertical height of the product. This recess can therefore extend between two opposite sides of the product and forms, for example, a hollow space in the product. According to the invention, the product is produced by means of an additive manufacturing technique in a powder bed.

The device according to the invention is suitable, for example, for manufacturing a three-dimensional product with a shape which, preferably, has a central axis such as a ring or a tube. Such products have a relatively large recess which is confined by a wall whose thickness is relatively small in relation to the diameter of the recess. The recess in these products usually extends over the full height of the product.

According to the invention, the product is built up in a powder bed around an insert, so that this insert is situated in said recess of the product.

The main advantage of such an insert is that the amount of powder to be used in the powder bed is much smaller than if there were no insert and therefore the entire recess would have to be filled with powder when manufacturing the product.

Another advantage is that the heat transfer from the product and from the powder bed to the environment, in particular to the wall of the building tube, and vice versa, is much more even as the amount of powder present around the product is much smaller while it is being manufactured, and that this powder is distributed more evenly around the product than if the entire recess of the product were filled with powder.

Figure 1:
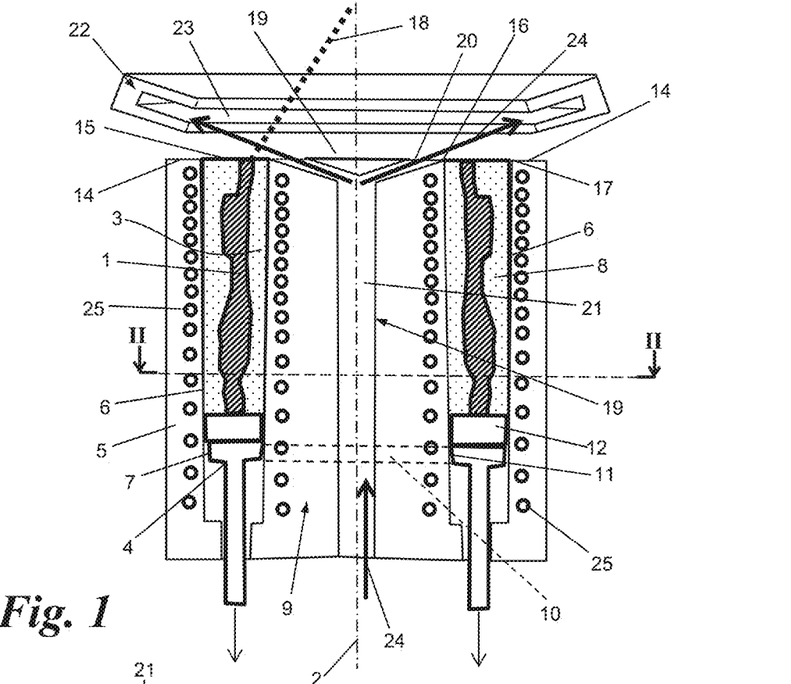
FIG. 1 is a schematic representation of a vertical cross-section of a building tube according to a first embodiment of the device according to the invention.
Figures 2, 3:
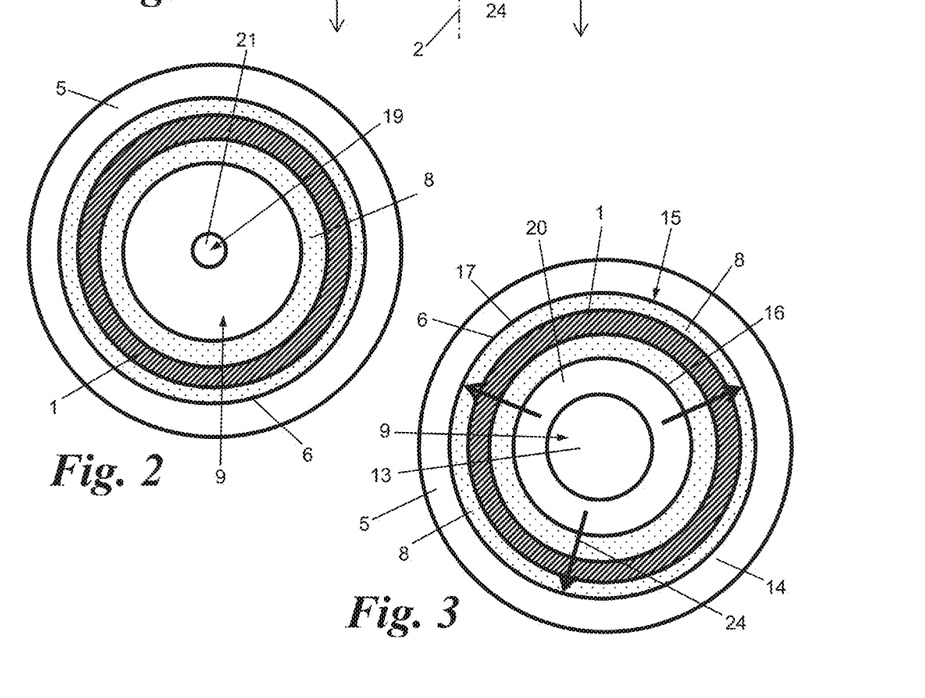
FIG. 2 is a schematic representation of a horizontal cross-section of the building tube from FIG. 1 according to line II-II, in which the powder bed extends over the entire circumference of an insert.
FIG. 3 is a schematic top view of the building tube from FIG. 1.

A first embodiment of the device according to the invention, as shown in FIGS. 1 to 3, makes it possible to manufacture a product 1 with a central axis 2 and with a recess 3 extending around this central axis 2. The central axis 2 of the product 1 often terms a symmetry axis of the latter.

The device according to the invention has a building chamber in which a building platform 4 and a cylindrical building tube 5 are provided. The building platform 4 extends in this building tube 5 and fits almost perfectly to the cylindrical wall 6 of the latter. This tube wall 6 extends in a vertical direction, whereby the platform 4 can be moved in this vertical direction in the building tube 5. The outer edge 7 of the platform 4 is connected to the tube wall 6.

In the building tube 5, the tube wall 6 thereof defines a space in which said powder bed 8 is to be formed during the manufacture of a product 1. An insert 9 is thus provided in this space. This insert 9 is, for example, cylindrical, as shown in FIGS. 1 to 3, and extends across a central recess 10 provided for this purpose in the building platform 4. Consequently, the building platform is 4 ring-shaped in this embodiment of the device according to the invention, wherein the inner edge 11 of the recess 10 in the building platform 4 connects to the insert 9. The insert 9 herein has a fixed position in relation to the tube 5.

When manufacturing the product 1, the powder bed 8 is built up layer by layer on the building platform 4 between the tube wall 6 and the insert 9, around the entire horizontal circumference of this insert 9. This is, in this embodiment, around the central axis 2.

In order to prevent the product 1, which is manufactured in the device, from becoming firmly connected to the building platform 4, this building platform 4 is provided with a support plate 12 on which the powder bed 8 is applied layer by layer and to which the bottom side of the product 1 to be manufactured has to be connected.

In de embodiment of the device according to the invention as shown in FIGS. 1 to 3, the top 13 of the insert 9 extends in almost the same horizontal plane as the top 14 of the building tube 5. This horizontal surface normally joins the top of the powder bed 8. In particular, the powder layers are formed on a building surface 15 extending at a distance from the top edge 14 of the building tube 5 which corresponds to the thickness of a powder layer. Thus, each powder layer is applied in a ring shape that extends horizontally between the insert 9 and the tube wall 6. The inner side 16 of this ring shape therefore connects to the insert 9, and the outer side 17 thereof connects to the tube wall 6.

While the product 1 is being manufactured, the building platform 4 is gradually moved down while the powder bed 8 is being built up by applying the successive powder layers to the building surface 15. The powder layers are applied by one or several powder distributors, which for clarity's sake are not shown in the figures. The successive powder layers are normally flattened by one or more scrapers before the next layer of powder is applied. Such a scraper is known as such by a person skilled in the art and is not shown either in the figures.

After a powder layer has been applied, an energetic ray 18 is moved across the powder layer in the building surface 15 according to a predetermined pattern to form a layer of the product 1. The energetic ray 18 makes powder from the powder layer melt locally and then solidify to form a layer of the product 1. Successive layers of the product 1 are formed and connected in this way. After forming a layer of the product 1, the building platform is moved down as mentioned. above, in order to apply a subsequent powder layer.

When the energetic ray 18 is incident on the powder from the last applied powder layer, flue gases and possibly dust particles, such as splashes or combustion particles, will be generated above the building surface 15. Such flue gases or dust particles may cause defects in the product being manufactured or may cause the energetic ray 18 to be scattered or to strike the powder bed 8 with a lower and/or uncontrollable intensity.

In order to discharge these flue gases and/or dust particles, according to the first embodiment of the invention, a first gas stream element 19 is provided which extends at least partially through the insert 9. This gas stream element 19 makes it possible to generate a gas stream 24 in which flue gases and/or dust particles are carried along and discharged. To this end, the gas stream element 19 comprises at least one gas stream line 21 which connects to at least one nozzle 20 which opens at the top 13 of the insert 9. The nozzles 20 of this gas stream element 19 have an inflow or outflow direction for said gas stream which is mainly radially directed over the powder bed 8, so that they allow a substantially radial gas stream to be generated. In the embodiment of the gas stream element 19 shown in FIGS. 1 to 3, it is provided with a nozzle 20 that forms an annular recess in the top 13 of the insert 9.

Furthermore, above the building tube 5, a second gas stream element 22 is provided with one or more nozzles 23, in particular at least one nozzle 23. The nozzles 23 of this second gas stream element 22 extend next to the powder bed 8, preferably along the entire upper edge 14 of the building tube 5. In FIGS. 1 to 3, said gas stream element 22 is provided with a nozzle 23 which continuously extends along the entire circumference of the building tube, with an opening that is directed towards the opposite nozzle 20 of said first gas stream element 19.

Both gas stream elements 19 and 22 work together t© generate a gas stream 24 across the powder bed 8 from the nozzle 20 at the top 13 of the insert 9 to the opposite nozzle 23 next to the building tube 5. This allows flue gases and combustion particles to be discharged from the building chamber. It goes without saying that, if necessary, the gas stream 24 can be created in the opposite direction, so that a flow is generated from the nozzle 23, above the top edge 14 of the building tube 5, to the opposite nozzle 20 at the top of the insert 9.

It is made sure that, when manufacturing a product 1, the energetic ray 18 is directed through the gas stream 24 to the powder bed 8. This ensures that any dust particles or flue gases that may have been formed are discharged almost immediately by means of the gas stream 24 when the energetic ray strikes the powder bed 8. Thus, the gas stream 24 preferably stretches through the path of the energetic ray 8. in addition, a laminar gas stream 24 is preferably generated to prevent powder from the powder bed 8 from being disturbed or being carried away in the gas stream 24.

According to a preferred embodiment of the invention, the gas stream 24 covers almost the entire top of the powder bed 8, more particularly the entire surface between the insert 9 and the tube wall 6.

Said gas stream line 21 of the first gas stream element 19 extends centrally according to said central axis 2 through the insert 9. This gas stream line 21 thus forms a pipe, one end of which is connected to the above-mentioned nozzle 20, while the opposite end of this gas stream line 21 is connected to a gas supply device at the bottom of the building platform 4. Thus, a gas, preferably an inert gas such as nitrogen gas, argon, etc., can be led through this gas stream line 21 and the corresponding nozzle 20 over the powder bed 8 to the opposite nozzle 23 in order to carry along flue gases or dust particles in the gas stream and to discharge the second gas stream element 22 via this nozzle 23. To this end, this second gas stream element 22 cooperates with an exhaust system that may contain a filter device.

In order to control the temperature of the powder bed 8 with the product 1, the tube wall 6 and/or the insert 9 comprise heat-regulating elements 25, such as heating elements or cooling elements. For example, these heat-regulating elements 25 can be formed by pipes that extend close to the surface of the tube wall 6 or insert 9, and through which a liquid such as a coolant flows, whose temperature and/or flow is controlled according to the desired temperature of the powder bed. If necessary, the heat-regulating elements 25 may consist of electrical resistors and/or induction systems.

Figure 5:
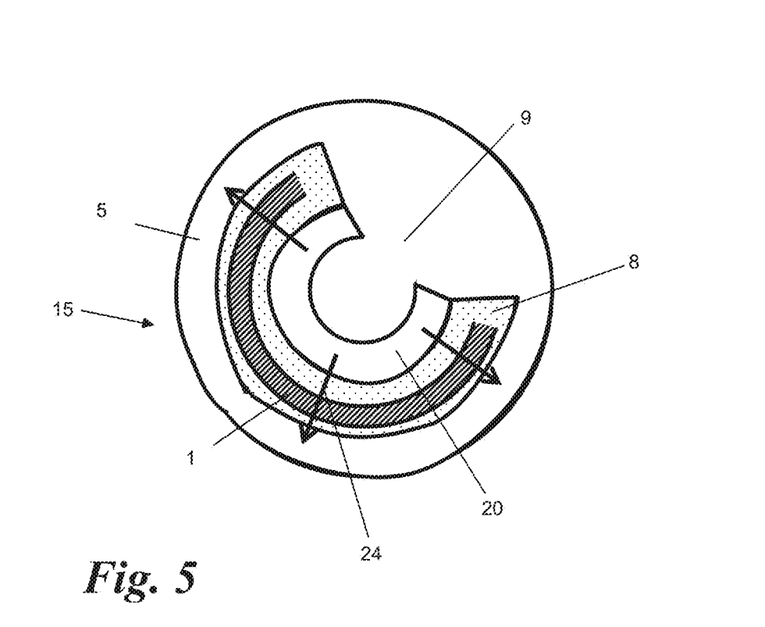
FIG. 5 is a schematic representation of a top view of the building tube according to a variant of the first embodiment of the device according to the invention, in which the powder bed extends over only part of the circumference of the insert.

According to another embodiment of the device and method according to the invention, the powder bed 8 is built up in layers around the insert 9 over only part of the horizontal circumference of this insert 9, as is shown in the top view of the building tube from FIG. 5. Consequently, the product 1 manufactured in this way also extends over only part of the circumference of the insert 9.

Figure 6:
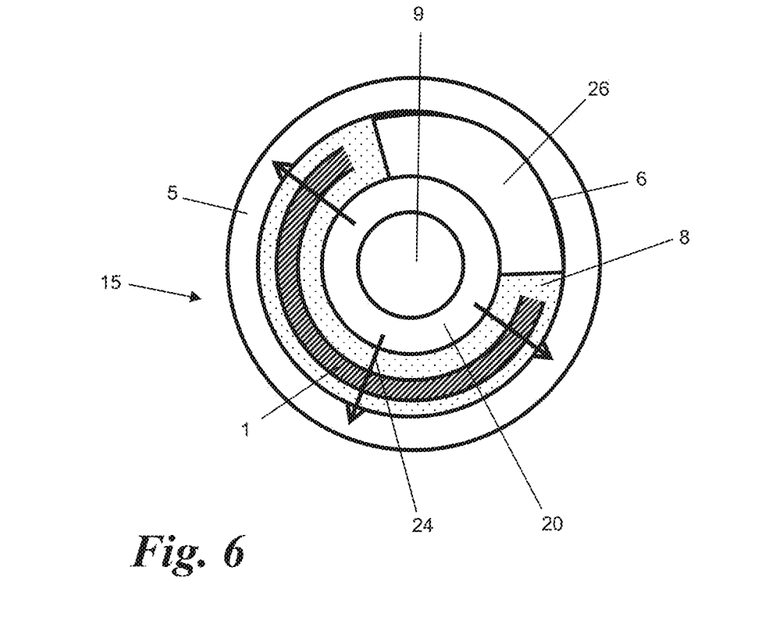
FIG. 6 is a schematic representation of a top view of the building tube according to a further variant of the first embodiment of the device according to the invention, in which an additional insert is located between the insert and the inner wall of the building tube, so that the powder bed only extends over part of the circumference of the insert.

In a variant of this embodiment according to the invention, shown in FIG. 6, an additional insert 26 is provided between the insert 9 and the tube wall 6, so that the powder bed 8 and the product 1 only extend over a part of the circumference of the insert 9.

Figure 4:
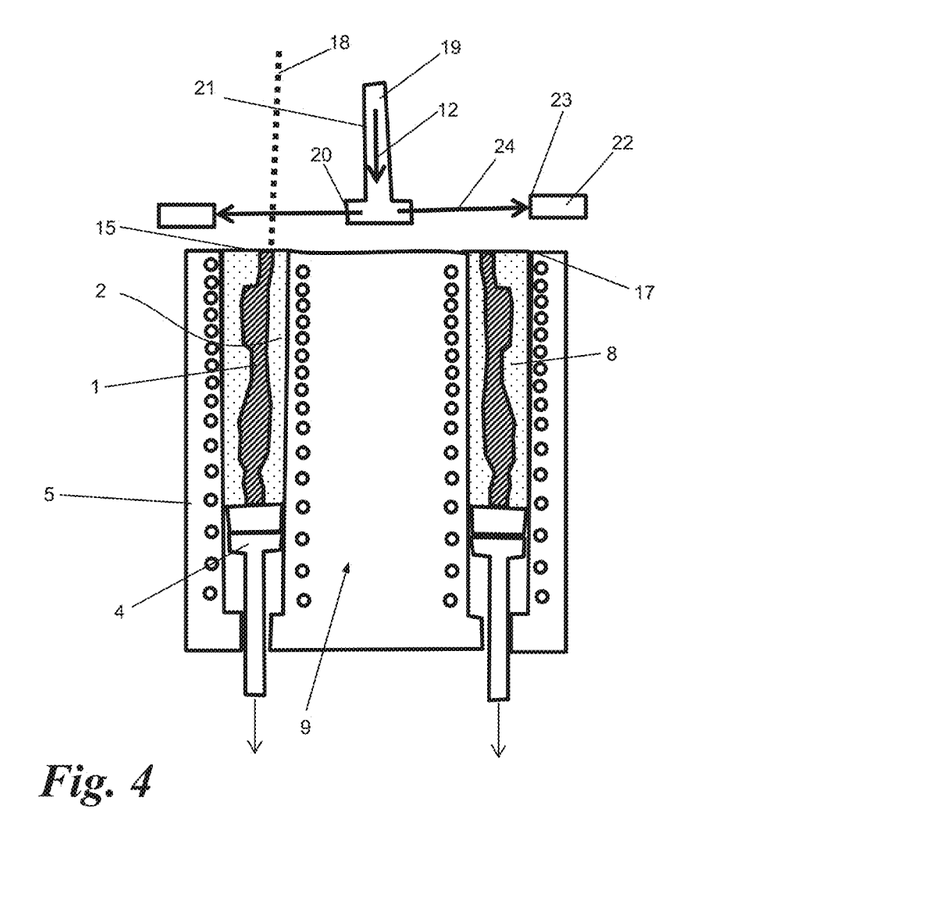
FIG. 4 is a schematic representation of a vertical cross-section of a building tube according to a second embodiment of the device according to the invention.

Yet another embodiment of the device according to the invention, is shown in FIG. 4. This embodiment is different from the first embodiment of the invention, as shown in FIGS. 1 to 3, as the first gas stream element 19 extends above the insert 9, wherein gas is fed through a gas stream line 21 which extends almost vertically above the building platform 4. More specifically, this second gas stream element 19 also has a nozzle 23 with one or more openings in order to allow the generation of a radial gas stream 24 across the powder bed 8. In this embodiment, the second gas stream element 22 substantially corresponds to the one in FIGS. 1 to 3.

Figure 7:
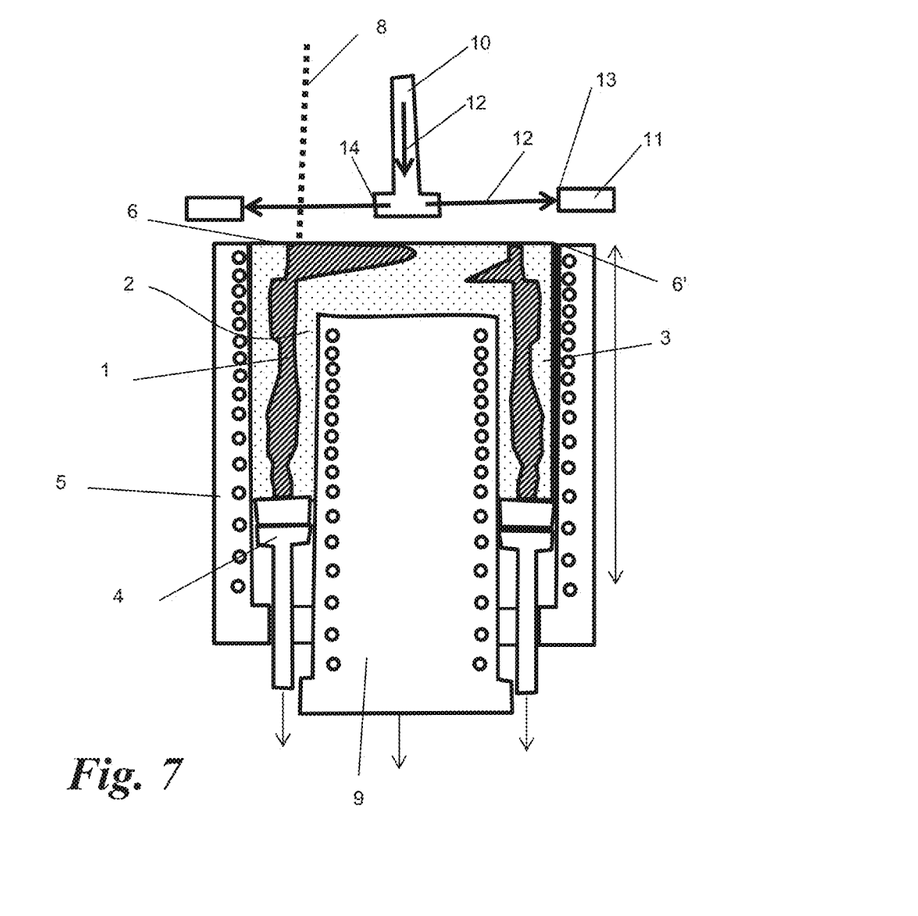
FIG. 7 is a schematic representation of a vertical cross-section of a building tube according to a third embodiment of the device according to the invention.

A further embodiment of the invention, which is shown in FIG. 7, differs among others from the previous embodiments in that the insert 9 can also be moved vertically in relation to the tube 5. Once a first part of the product 1 has been built up in a first step as described above, the insert 9, together with the building platform 4, is moved down in a second step, and the subsequent powder layers are also applied over the top 13 of the insert 9. In particular, the building surface 15 then extends both above the building platform 4 and above the top 13 of the insert 9. This makes it possible to further build up the product 1, wherein said recess 3 in the product 1 is at least partially sealed, for example, by the manufacturing of the product 1 above the insert 9.

Figure 8:
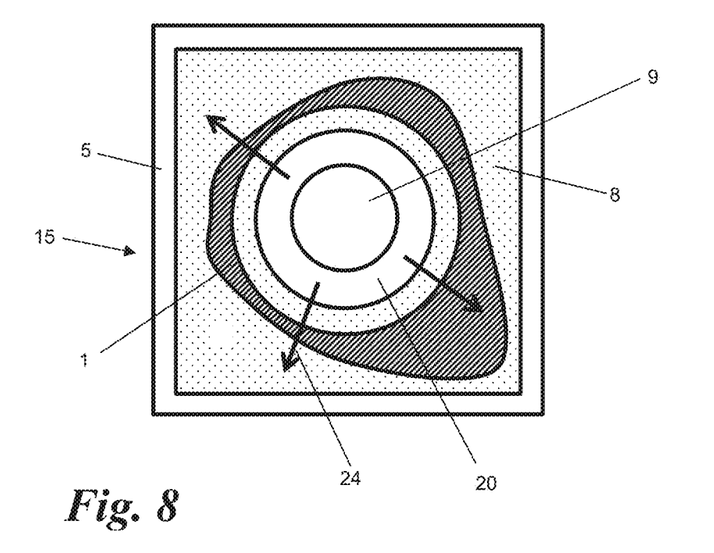
FIG. 8 is a schematic top view of the building tube with an insert according to an alternative embodiment of the device according to the invention.

A further embodiment of the invention, shown in FIG. 8, is different from the above-described embodiments in that the building tube 5 has a horizontal cross-section which is square and therefore not circular. Thus, it is possible to manufacture products 1 which, for example, are not symmetrical or do not have a circular cross-section.

Figure 9:
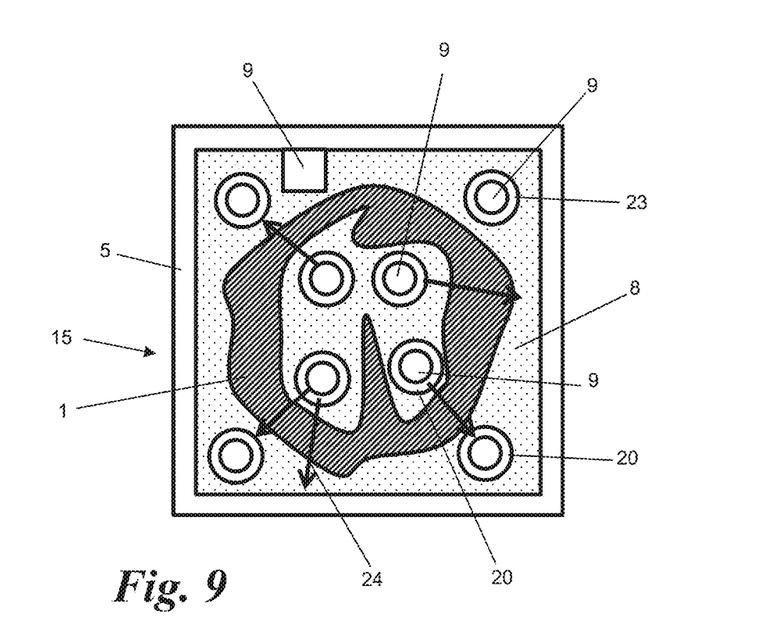
FIG. 9 is a schematic top view of the building tube with several inserts according to yet another alternative embodiment of the device according to the invention.

The alternative embodiment of the device according to the invention, which is shown in FIG. 9, differs from the previous embodiment in that several inserts 9 are provided. One or more of these inserts 9 can be equipped with the first gas stream element 19 with a corresponding nozzle 20 through which either gas from the gas stream 24 is supplied or gas from this gas stream 24 is discharged. In addition, one or more additional inserts 9 can be equipped with the second gas stream element 22 with the corresponding nozzle 23, through which gas from the gas stream 24 is also either supplied or gas from this gas stream 24 is discharged. In this way, for example, the gas stream 24 can flow at least partially between the inserts 9. The product 1 in this embodiment can, preferably, be built up at least partially between two or more different inserts 9. Other inserts that do not contain a gas stream element can also be provided.

It goes without saying that the direction of the gas stream 24 can be reversed for each of the embodiments of the invention described above. Furthermore, it is also possible for the gas stream 24 to be discharged through one or more nozzles 20 or 23 which are provided in the wall of the building chamber. In that case, for example, one or more nozzles 20 at the top 13 of the insert 9 will take care of the supply of the gas stream and will steer this gas stream across the powder bed 8.

Naturally, the invention is not limited to the devices and methods described above and their embodiments represented in the accompanying figures. Thus, the different characteristics of these embodiments and variants can be mutually combined.

Thus, the building tube can take on different shapes. It may not only be cylindrical, but also beam-shaped, for example, with a horizontal cross-section which is, for example, rectangular. Furthermore, the insert can also take on all kinds of shapes depending on the product to be manufactured. The central longitudinal axes of the building tube and/or the product do not necessarily have to coincide. The building tube and/or the product do not necessarily have to be symmetrical and/or must not necessarily have a symmetrical axis.

Thus, the tube wall, the insert and the building platform can take on all kinds of shapes, possibly depending on the shape of the product to be manufactured. The building platform here extends horizontally between the insert and the tube wall and can also be moved vertically between them. The horizontal cross-sections of the space between the insert and the tube wall are therefore, preferably, identical over the entire height of the powder bed. Preferably, the insert is positioned perpendicularly to the building platform here. Thus, the formed products are not necessarily asymmetrical. Several individual inserts can thus also be provided if the product to be manufactured has, for example, several individual cavities.

Furthermore, said one or several second nozzles can also be set up in the building chamber at a distance from the top of the building tube.

The nozzles of the first gas stream element and/or the second gas stream element can also be moved at least vertically in relation to the insert and/or the building tube.

The device and the method according to the invention can be used with a large number of different techniques for the additive manufacturing of a product.

Thus, the invention can be used, for example, in selective laser melting (SLM), selective laser sintering (SLS), electron beam additive manufacturing (EBM), multi-jet fusion and other techniques in which successive powder layers are struck by an energetic beam, such as a laser beam, or by using a 2D radiation array, to melt all or part of the powder in these layers and to then solidify or sinter it to form successive interconnected layers of the product. Optionally, this can be combined with the addition of binders or selective radiation absorbing or reflecting materials.

In such production methods, after the application of each powder layer, at least one energetic beam of rays, such as a laser beam, is moved across the powder layer in order to melt, at least partially, the powder from this powder layer and allow it to solidify or sinter, so that a layer of the product is formed. The building platform is then moved down over a distance corresponding to the thickness of one powder layer in order to distribute a subsequent powder layer on the building surface and thus form successive interconnected layers of the product.

It goes without saying that in an alternative embodiment of the invention, the building platform can be fixed while the insert and/or the building tube is moved upwards as the various successive layers are being built up.

The invention can be applied in a similar way to additive manufacturing techniques in which a binder or selective energy absorber or energy reflector is printed on the powder, either or not in combination with the irradiation of the powder layer by a radiation source. In general, the invention can be applied in any production technique where successive powder layers have to be deposited.

The invention claimed is:

1. Device for the layered manufacturing of a three-dimensional product (1) from successive powder layers by means of an additive manufacturing technique,
   wherein this product (1) has at least one recess (3),
   wherein this device has a building chamber with a building tube (5) and a building platform (4) which can be moved in a vertical direction in relation to each other,
   wherein the building platform (4) extends in the building tube (5) with an outer edge (7) connecting to a tube wall (6) of this building tube (5),
   wherein a horizontal building surface (15) must extend above the building platform (4) in the building tube (5),
   wherein further a powder distributor is provided for applying successive powder layers to said building surface (15), a radiation source for generating an energetic beam of rays (18), and scanning means cooperating with the radiation source to make the beam of rays (18) strike said successive powder layers and move them across these powder layers in order to form successive interconnected layers of said product (1), wherein at least one insert (9) is provided which extends vertically, at least partially, through a recess (10) in the building platform (4) provided to that end, so that the building platform (4) and the insert (9) can be moved vertically in relation to each other, wherein the insert (9) substantially fits to the interior of the recess (10) in the building platform (4), characterized in that this device comprises at least a first gas stream element (19) with at least a first nozzle (20) that opens at the top (13) of the insert (9), while at least a second gas stream element (22) is provided with at least a second nozzle (23), in order to allow a gas stream (24) to be generated above said building surface (15) between said first gas stream element (19) and said second gas stream element (22) in order to discharge any flue gases, splashes and/or dust particles produced in the course of the manufacture of said product (1).

2. Device according to claim 1, wherein the building surface (15) must extend at least partially between the insert (9) and the inner wall (6) of the tube (5) in order to build up said product (1) at least partially around this insert (9), so that when manufacturing the product (1) the insert (9) will be situated at least partially in the recess (3).

3. Device according to claim 1, wherein the nozzle (23) of the second gas stream element (22) extends sideways along the tube (5).

4. Device according to claim 1, wherein the building tube (5) has a horizontal open top (14) along which the building surface (15) extends above the building platform (4).

5. Device according to claim 1, wherein the nozzle (23) of said second gas stream element (22) extends above said building surface (15).

6. Device according to claim 1, wherein said insert (9) has a top (13) which extends in the plane of the upper edge (14) of said tube (5).

7. Device according to claim 1, wherein said tube (5) has a vertical central axis coinciding with a vertical central axis of said insert (9).

8. Device according to claim 1, wherein said first gas stream element (19) extends at least partially through said insert (9).

9. Device according to claim 1, wherein the nozzle (20) of the first gas stream element (19) extends in said insert (9).

10. Device according to claim 1, wherein the nozzle (20) of the first gas stream element (19) extends above said insert (9).

11. Device according to claim 1, wherein at least the nozzle (20) of said first gas stream element (19) can be moved at least vertically in relation to said insert (9).

12. Device according to claim 1, wherein said second gas stream element (22) has a nozzle (23) with an opening extending substantially along the entire circumference of the top (14) of said building tube (5).

13. Device according to claim 1, wherein said second gas stream element (22) has a nozzle (23) with an opening directed towards the nozzle (20) of said first gas stream element (19), wherein the nozzle (23) of said second gas stream element (22) and said building tube (5) can be moved in relation to each other so as to allow said gas stream (24), which is to be created above said building surface (15), to be moved in such a way that said beam of rays (18) is incident through the gas stream (24) on said powder layers under this gas stream (24).

14. Device according to claim 1, wherein said insert (9) and/or the wall (6) of the building tube (5) contain heat-regulating elements (25) making it possible to adjust the temperature of the building tube (5) and of powder contained in the building tube (5).

15. Method for the layered manufacture of a three-dimensional product (1) having at least one recess (3), in which successive powder layers are applied to a building surface (15) above a building platform (4), wherein this building platform (4) extends in a space present between a tube wall (6) of a building tube (5) and an insert provided therein (9), wherein a beam of rays (18) is made to impinge on each powder layer and this beam (18) is moved across the powder layer to form successive layers of said product (1) in said space above the building platform (4), so that the insert (9) extends at least partly in said recess (3) of the product (1), wherein, after a layer of the product (1) has been formed, the building platform (4) is moved down over a height matching the thickness of a powder layer, after which another powder layer is applied, characterized in that a gas stream (24) is generated above the building surface (15), extending at least partially above said space from the upper edge (14) of said building tube (5) to the top (13) of said insert (9), or vice versa, wherein it is made sure that this gas stream (24) crosses said beam of rays (18) wherein flue gases, splashes and/or dust particles formed while the beam of rays (18) strikes said powder layer, are discharged through this gas stream (24).

16. Method according to claim 15, wherein a laminar gas stream (24) is generated between the upper edge (14) of said tube wall (6) and the top (13) of said insert (9).

17. Method according to claim 15, wherein said insert (9) is provided centrally in said building tube (5) and wherein said gas stream (24) is made to flow in a radial direction above the building surface (15).

18. Method according to claim 15, wherein said gas stream (24) extends over substantially said entire space.

19. Method according to claim 15, wherein in a subsequent step the building platform (4), together with the insert (9), is moved vertically down over a height corresponding to the thickness of a powder layer after a layer of the product (1) has been formed, and another powder layer is then applied above the building platform (4) and the insert (9).

* * * * *